US010360255B2

(12) United States Patent
Almas et al.

(10) Patent No.: US 10,360,255 B2
(45) Date of Patent: Jul. 23, 2019

(54) SYSTEMS AND METHODS TO DETERMINE LOCATION OF MEDIA ITEMS (71) Applicant: Facebook, Inc., Menlo Park, CA (US)

(72) Inventors: Hassan Almas, New York, NY (US); Lubomir Bourdev, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 432 days.

(21) Appl. No.: 14/962,575

(22) Filed: Dec. 8, 2015

(65) Prior Publication Data

US 2017/0161280 A1    Jun. 8, 2017

(51) Int. Cl.
G06K 9/00    (2006.01)
G06K 9/62    (2006.01)
G06Q 50/00   (2012.01)
G06F 16/487  (2019.01)

(52) U.S. Cl.
CPC ....... *G06F 16/487* (2019.01); *G06K 9/00677* (2013.01); *G06K 9/6268* (2013.01); *G06Q 50/01* (2013.01); *G06K 2209/27* (2013.01)

(58) Field of Classification Search
CPC ............ G06F 17/3033; G06F 17/3053; G06F 17/30598; G06F 16/487; G06K 9/6255; G06K 9/627; G06K 2209/27; G06K 9/00677; G06K 9/6268; G06Q 50/01

USPC .................................................. 707/736, 747
See application file for complete search history.

(56) References Cited

U.S. PATENT DOCUMENTS

| | | | | |
|---|---|---|---|---|
| 8,095,521 B2 * | 1/2012 | Chan | ...................... | G06Q 30/02 707/705 |
| 2005/0102260 A1 * | 5/2005 | Spring | ................ | G06F 21/6245 707/E17.116 |
| 2008/0178302 A1 * | 7/2008 | Brock | ................. | H04L 63/0263 726/32 |
| 2010/0268628 A1 * | 10/2010 | Pitkow | ..................... | G06F 21/10 705/34 |
| 2012/0166376 A1 * | 6/2012 | Ohama | .................... | G06F 16/58 706/20 |

\* cited by examiner

*Primary Examiner* — Phong H Nguyen
(74) *Attorney, Agent, or Firm* — Sheppard Mullin Richter & Hampton LLP (57) ABSTRACT Systems, methods, and non-transitory computer readable media are configured to generate a hash value of an evaluation content item. Hash values of a plurality of content items associated with location information are generated. A pairwise distance value between the hash value of the evaluation content item and a hash value of each content item of the plurality of content items assigned to a group of a plurality of groups is determined. A score for each group of the plurality of groups is generated based on a combination of distance values for the group. At least one location associated with the evaluation content item is determined based on scores for the plurality of groups.

19 Claims, 8 Drawing Sheets

SYSTEMS AND METHODS TO DETERMINE LOCATION OF MEDIA ITEMS

FIELD OF THE INVENTION

The present technology relates to the field of content provision. More particularly, the present technology relates to techniques for determining location for media or other content items in a social networking system.

BACKGROUND

Today, people often utilize computing devices for a wide variety of purposes. Users can use their computing devices, for example, to communicate and otherwise interact with other users. Such interactions are increasingly popular over a social networking system.

Interactions in a social networking system may include the sharing of content. Metadata about a content item can be important to both users of the social networking system and the social networking system alike. Location information associated with a content item, such as an image, video, or other media type, is one example of such metadata. In some instances, location information associated with a content item included in a post to the social networking system can provide to viewers of the post a more complete narrative about the post and thereby enhance user experience with respect to the post. Location information associated with a content item can be relevant in many other contexts and interactions supported by the social networking system.

SUMMARY

Various embodiments of the present technology can include systems, methods, and non-transitory computer readable media configured to generate a hash value of an evaluation content item. Hash values of a plurality of content items associated with location information are generated. A pairwise distance value between the hash value of the evaluation content item and a hash value of each content item of the plurality of content items assigned to a group of a plurality of groups is determined. A score for each group of the plurality of groups is generated based on a combination of distance values for the group. At least one location associated with the evaluation content item is determined based on scores for the plurality of groups.

In an embodiment, the evaluation content item is associated with a position subject to a range of error.

In an embodiment, each content item of the plurality of content items is assigned to a group of a plurality of groups associated with a plurality of locations based on the location information.

In an embodiment, assignment of the content item to the group satisfies a threshold confidence level.

In an embodiment, an area is determined based on application of a threshold radius value to a position associated with the evaluation content item. The plurality of content items are selected from a set of content items based on locations associated with the plurality of content items that fall within the area.

In an embodiment, a weight is applied to each distance value.

In an embodiment, the weight is based on an exponential decay function.

In an embodiment, the scores for the plurality of groups are sorted. At least one group is selected based on application of a threshold selection value to the sorted scores. The at least one location is provided to a user as a candidate location for the evaluation content item. The at least one location is associated with the selected at least one group.

In an embodiment, each location of the plurality of locations is at least one of a place, an address, a residence, an establishment, and other type of location.

In an embodiment, the combination of distance values for the group is a summation of weighted distance values for the group.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Determining a Precise Location for a Content Item

As mentioned, interactions in a social networking system may include the sharing of content. Metadata about a content item can be important to both users of the social networking system and the social networking system alike. Location information associated with a content item, such as an image, a video, or other media type, is one example of such metadata. The location information associated with a content item can enhance user experience on the social networking system in a variety of manners. For example, location information associated with a content item included in a post can provide to viewers of the post a more complete narrative about the post. As another example, location information can be used to index content maintained by the social networking system so that a search of the content can be based on location related criteria. Location information associated with a content item can be relevant in many other interactions supported by the social networking system.

Conventional techniques rooted in computer technology can provide rudimentary location information associated with a content item. When a content item is uploaded to a content management platform, such as a social networking system, the content item can be accompanied with location information constituting GPS coordinates where the content item was captured. The GPS coordinates can be determined by a resource on a client computing device that uploaded the content item. However, even when they are available, the GPS coordinates are often too imprecise to be identify a particular location. For example, when accounting for a range of error to which the GPS coordinates may be subject, a precise and accurate identification of a particular location for the content item can be elusive.

An improved approach implemented in computer technology to determine a precise location associated with a content item overcomes these and other disadvantages associated with conventional approaches rooted in computer technology. Systems, methods, and computer readable media of the present technology can maintain a set of content items associated with location information identifying particular locations. A subset of the content items can be selected based on their proximity to an evaluation content item for which a coarse indication of position is available. A plurality of groups can be determined with each group corresponding to a distinct location determined from the location information associated with the selected content items. Each selected content item can be assigned to a group based on its location information. The content items can be applied to an image classifier that generates a hash value for each content item based on image data reflected in the content item. To determine a precise location associated with an evaluation content item, a hash value can be generated for the evaluation content item. For each group of content items, hash values can be generated for the content items. A pairwise distance can be calculated between the evaluation content item and each content item in the group. Each calculated distance can be weighted by a decay function. The weighted distances for the content items in the group can be summed to generate a score. The scores for the groups can be sorted to generate a sorted list of groups and corresponding locations. A threshold applied to the list can identify a selection of one or more candidate locations associated with the evaluation content item. More details regarding the present technology are described herein.

Figure 1:
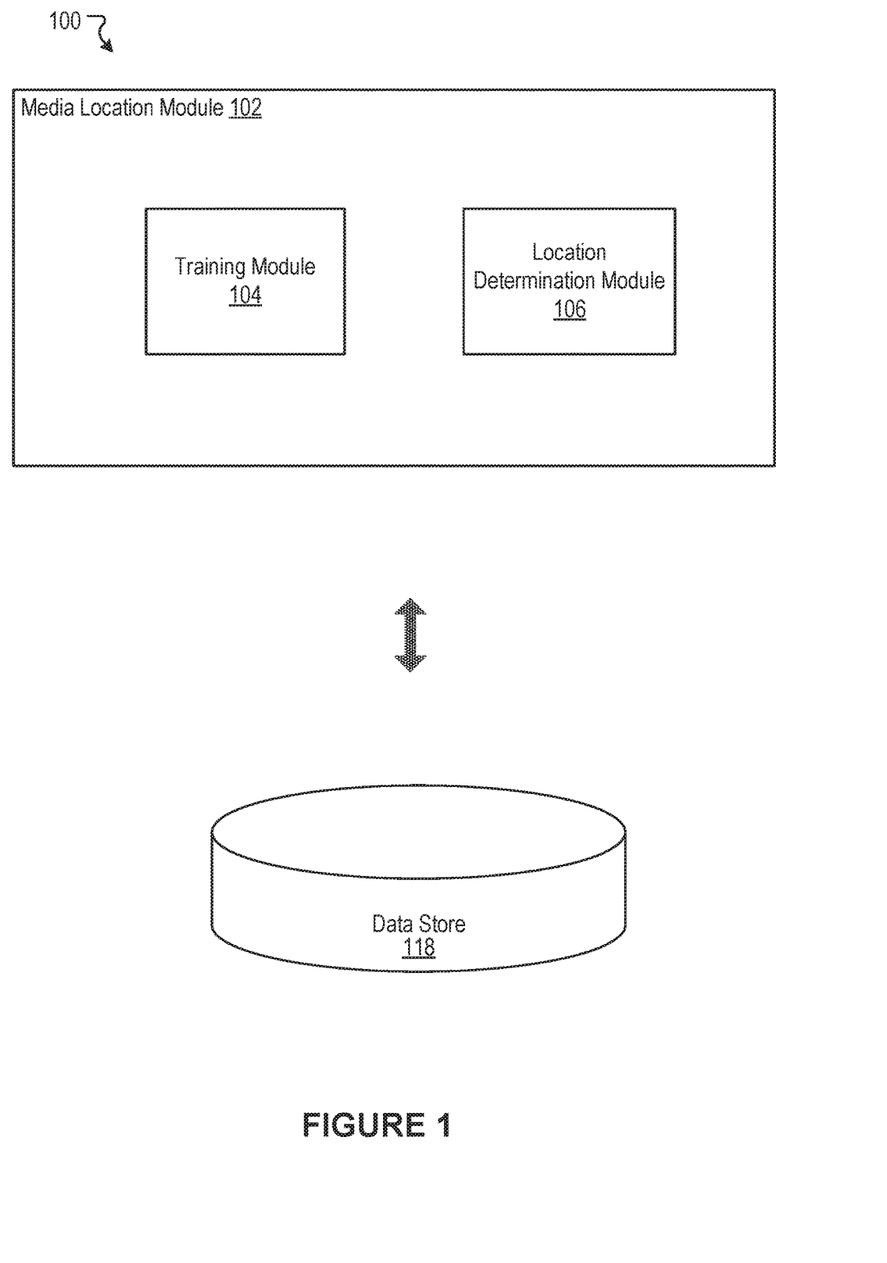
FIG. 1 illustrates a system including an example media location module, according to an embodiment of the present technology.

FIG. 1 illustrates an example system 100 including an example media location module 102 configured to determine location information for a content item, according to an embodiment of the present technology. A content item can include any media item or type that constitutes or includes one or more of an image, a video, audio, etc. While an image or images may be exemplarily discussed in certain contexts for ease of reference herein, any content item can be applicable in accordance with the present technology. The media location module 102 can include a training module 104 and a location determination module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the media location module 102 can be implemented in any suitable combinations.

The training module 104 can train a classifier to perform a classification analysis on a content item and to generate a hash value for the content item. The classifier can receive a training set of content items, such as images and videos. In some embodiments, the content items can include tag information provided by users who uploaded the content items to a content management platform, such as a social networking system. The tag information can include information that is descriptive of concepts reflected by the content item. The tag information also can include location information. The location information can be any information that identifies, conveys, or suggests a particular place, address, establishment, or any other type of location.

The classifier can be trained to provide a determination of topics reflected by a content item. In a training phase, the classifier can be developed based on any machine learning technique, including but not limited to a deep convolutional neural network. Contextual cues, including the tag information, for a sample set of images can be gathered. Images classes corresponding to various topics can be determined. Correlation of the sample set of images with the image classes based on the contextual cues can be determined. A training set of images can be generated from the sample set of images based on scores indicative of high correlation. The training set of images can be used to train the classifier to generate visual pattern templates of the image classes. In an evaluation phase, the classifier can be applied to one or more content items to determine the topics reflected by the content items. The topics can include higher level categories of elements reflected in the images as well as specific identification of the elements themselves.

The classifier also can be trained to provide a hash value based on data reflected in the content item, such as image data reflected in the content item. The hash value can be generated by any suitable hashing function or technique. For example, the hashing function or technique can include a locality preserving hashing function or a locality sensitive hashing function. In this regard, the classifier can be trained so that images that are closer in appearance have hash values that are closer in distance. Likewise, the classifier can be trained so that images that are farther in appearance have hash values that are farther in distance.

In some embodiments, inclusion or exclusion of a content item in the training set of content items can be based on data reflected by the content item. In an embodiment, content items that do not reflect data indicative of a location where the content item was captured can be excluded. If a content item predominantly reflects elements that do not convey location information, the content item can be excluded from the training set of content items. One example of such a content item is an image that primarily or entirely depicts an object with little or no background or other information relating to or indicative of location. In some embodiments, some content items can be excluded from the training set of content items in this manner because determinations of location information by the classifier are not facilitated by such content items. If a content item does not predominantly reflect elements that do not convey location information, the content item can be included in the training set of content items.

The location determination module 106 can determine one or more candidate locations for an evaluation content item based at least in part on the training module 104. From a set of content items associated with precise location information, a subset can be selected based on content items in the subset that are associated with locations that fall within an area containing a position associated with the evaluation content item. The location determination module 106 can organize each content item in the subset of content items into a group based on its associated location. Hash values of the evaluation content item and the content items in a group are generated, processed, and ranked to generate a score for the group. The groups can be sorted based on their scores to provide a selection of one or more candidate locations for the evaluation content item. The location determination module 106 is discussed in more detail herein.

In some embodiments, the media location module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media location module 102 can be, in part or in whole, implemented as software running on one or more computing devices or systems, such as on a server or a client computing device. For example, the media location module 102 can be, in part or in whole, implemented within or configured to operate in conjunction or be integrated with a social networking system (or service), such as a social networking system 630 of FIG. 6. As another example, the media location module 102 can be implemented as or within a dedicated application (e.g., app), a program, or an applet running on a user computing device or client computing system. In some instances, the media location module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the media location module 102. The data can include data relating to, for example, training content items, evaluation content items, position information for evaluation content items, a classifier, groups of content items, hash values for content items, distance values between hash values, a decay function, scores for groups, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the media location module 102 can be configured to communicate and/or operate with the data store 118.

Figure 2:
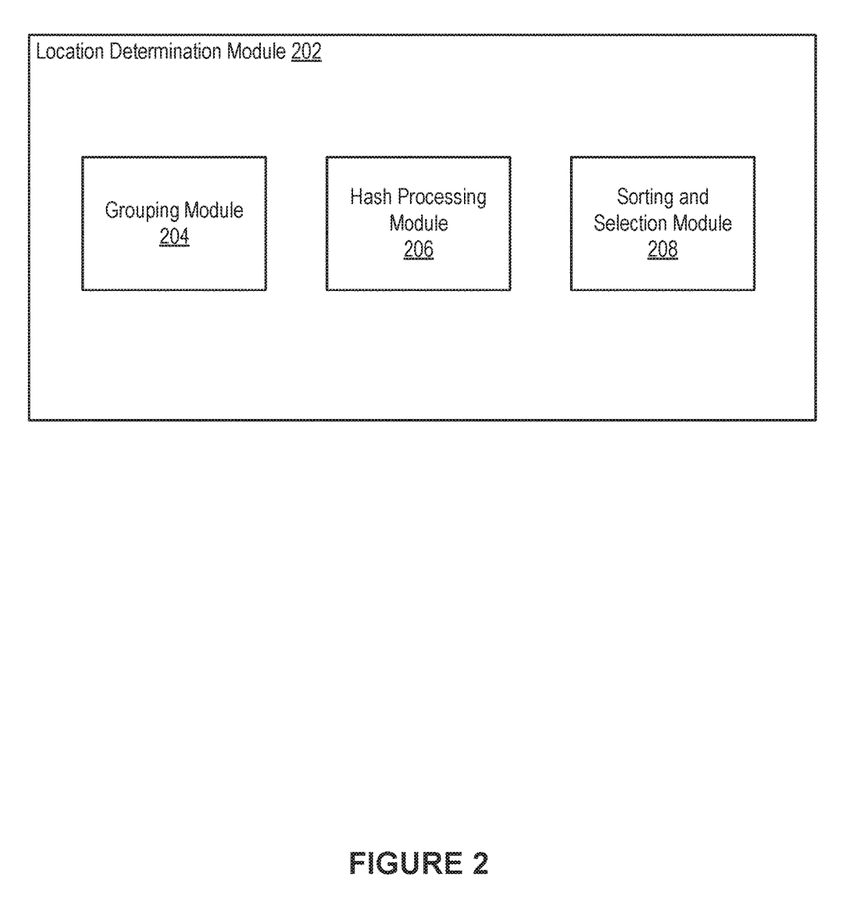
FIG. 2 illustrates an example location determination module, according to an embodiment of the present technology.

FIG. 2 illustrates an example location determination module 202, according to an embodiment of the present technology. In some embodiments, the location determination module 106 of FIG. 1 can be implemented with the user location determination module 202. The location determination module 202 can include a grouping module 204, a hash processing module 206, and a sorting and selection module 208.

The grouping module 204 can organize certain content items into groups associated with distinct locations. In some embodiments, tag information associated with a content item can convey location information that is indicative of a specific, precise location where a content item was captured. For example, the location information conveyed by the tag information can be based on one or more tags provided by a user who uploaded the associated content item to a content management platform, such as a social networking system. In some embodiments, the location information associated with a content item can be provided automatically. For example, the location information can be determined based on use of a location identification service, such as use of a contemporaneous check in service by the user who uploaded the content item. The location information associated with a content item can identify a place, an address, a residence, an establishment, or other distinct location to a threshold confidence level.

The grouping module 204 can identify a subset of the content items associated with location information. As discussed, the evaluation content item can be associated with GPS coordinates or other imprecise designation of position. The imprecise designation of position can be associated with a range of error. For example, the range of error can be expressed in terms of a coordinate range or a distance range. The grouping module 204 can apply a threshold radius value to the coarse or imprecise designation of position associated with the evaluation content to define an area. The threshold radius value can be a value configurable by an administrator in control of the media location module 102. For example, the threshold radius value can be one half kilometer, one kilometer, five kilometers, or the like. The subset of content items that are associated with a location within the area defined by the position of the evaluation content item and the threshold radius value can be selected by the grouping module 204.

The grouping module 204 can organize the selected content items into groups based on location information associated with the content items. The grouping module 204 can determine a plurality of particular locations indicated or otherwise identified by the location information associated with the selected content items. The locations can be determined based on a variety conventional techniques, such as a semantic analysis of the location information, a suitable clustering technique, and the like. After the locations are determined, each content item of the selected content items can be assigned to one of the locations based on associated location information of the content item. All of the content items associated with a location can constitute a group. In this manner, each location can have an associated group.

The hash processing module 206 can process an evaluation content item and groups of content items to determine scores for the groups. In some embodiments, an evaluation content item for which a determination of precise location is desired can be any content item. In other embodiments, a content item that predominantly reflects elements (e.g., faces, dogs, and the like) that are not indicative of location can be excluded as an evaluation content item from application to the media location module 102 because a location determination for the content item, even when otherwise possible, may not enhance interactions with the content item on a social networking system or otherwise optimize accessibility of the content item.

For each group of content items, a hash value for the evaluation content item and the hash values for each content item in the group can be received from the training module 104. The hash processing module 206 can perform a pairwise distance calculation between the hash value of the evaluation content item and each content item in the group to generate a pairwise distance value. Any suitable distance calculation technique can be used. In one example, a Hamming distance calculation can be used.

The hash processing module 206 can apply a decay function as a weight to each pairwise distance value with respect to the group to generate a weighted pairwise distance value. A decay function can be selected such that application of the decay function to a distance value can result in a higher value for the weighted pairwise distance value when similarity between the evaluation content item and a first content item in the group is higher and a lower value for the weighted pairwise distance value when similarity between the evaluation content item and a second content item in the group is lower. In some embodiments, the decay function can be exponential. For example, a negative square distribution or any other suitable exponential decay technique can be used.

The hash processing module 206 can sum the weighted pairwise distance values for a group. The sum can represent a score for the group. The hash processing module 206 can repeat the same processing techniques for all groups associated with the particular locations determined based on the location information. In this regard, pairwise distance values between the hash value of the evaluation content item and the hash value of each content item in each group can be determined. Each pairwise distance value in the group can be weighted by a decay function. The weighted pairwise distance values can be summed to generate a score for the group. Ultimately, every group associated with a particular location can be associated with a score.

In some embodiments, based on a decay function, such as an exponential decay function, an instance of strong similarity between an evaluation content item and one content item in a group can result in a score for the group that is significantly higher than a score for another group in which there are many instances of weak similarity between the evaluation content item and various content items. In some embodiments, the characteristics of the decay function can be determined or refined by machine learning. For example, if the decay function generates scores for groups that ultimately cause incorrect selections of groups and associated locations for evaluation content items, the decay function can be modified through machine learning to optimize location determination.

The sorting and selection module 208 can sort the scores associated with groups. In one embodiment, the scores can be sorted to create a list in an order from highest to lowest. A threshold selection value can be applied to the list to identify one or more candidate groups and their associated locations for the evaluation content item. The threshold selection value can be a suitable number of groups or a score value. For example, when the threshold selection value is a number of groups, the top number of groups from the list can be selected by the sorting and selection module 208. As another example, when the threshold selection value is a score value, groups having scores that are equal to or greater than the score value can be selected by the sorting and selection module 208.

The threshold selection value can be based on an application of or context for the media location module 102. In some embodiments, when the media location module 102 is applied to determine a location for a content item uploaded by a user to a content management platform, such as a social networking system, the sorting and selection module 208 can determine a threshold selection value so that a fewer number of groups are selected. For example, in response to the uploading by a user of a content item, the sorting and selection module 208 can select a group having a highest score so that one candidate location, the location associated with the selected group, can be presented to the user for confirmation as the location where the content item was captured. In other embodiments, when the media location module 102 is utilized for other purposes, any suitable number of top groups can be selected and the same number of associated locations can be provided for the intended purpose.

Figure 3:
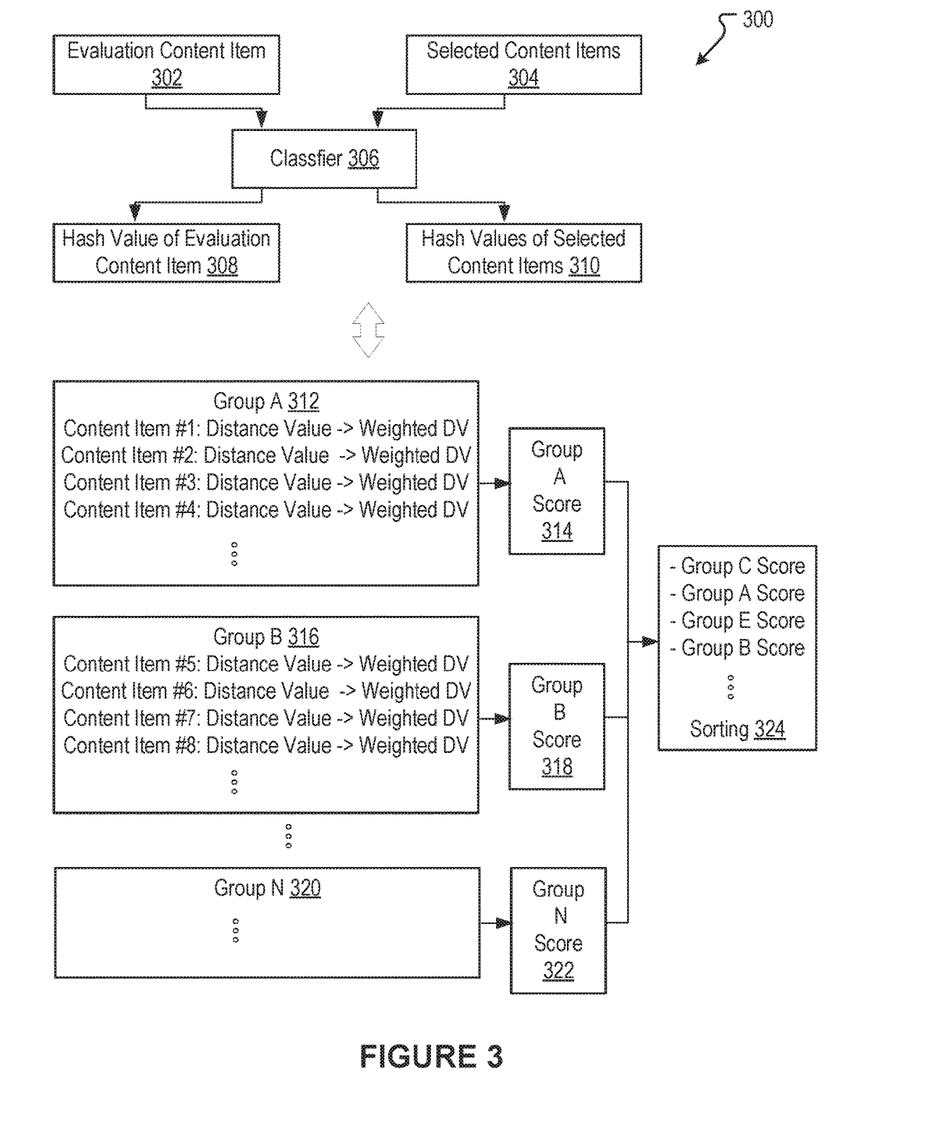
FIG. 3 illustrates an example scenario for determination a location for an evaluation content item, according to an embodiment of the present technology.

FIG. 3 illustrates an example scenario 300 to determine a specific location for an evaluation content item, according to an embodiment of the present technology. In the scenario 300, an evaluation content item 302 for which a precise location is to be determined can include an image or a video. The scenario 300 also involves content items associated with location information for the content items. The location information can be conveyed by tag information associated with the content items or by other techniques such as check in services. The evaluation content item 302 can be associated with a position that is subject to a range of error, such as GPS coordinates. A threshold radius value can be applied to the position associated with the evaluation content item 302 to define an area from which to select a subset of content items associated with location information. In particular, the content items associated with locations that fall within the area can be selected to constitute selected content items 304. In some embodiments, content items that predominantly reflect elements that are not indicative of location can be excluded from the selected content items 304.

The selected content items 304 can be organized into groups associated with locations corresponding to the selected content items 304. In some embodiments, location information associated with the selected content items 304 can be analyzed to identify distinct locations. Based on their location information, content items of the selected content items 304 associated with a first location are assigned to a first group associated with the first location, content items of the selected content items 304 associated with a second location are assigned to a second group associated with the second location, and so on. As shown, some of the selected content items 304 are assigned to a first group, group A 312, some of the selected content items 304 are assigned to a second group, group B 316, and some of the selected content items 304 are assigned to a last group, group N 320. Group A 312 corresponds to a first distinct location, group B 316 corresponds to a second distinct location, and group N 320 can correspond to an nth distinct location. N can be a number of distinct locations associated with the selected content items 304.

The evaluation content item 302 and the selected content items 304 can be provided to a trained classifier 306. The classifier 306 can be trained to identify concepts reflected in content items and to generate a hash value for a content item. For the evaluation content item 302, the classifier 306 can provide a hash value 308 of the evaluation content item 302. For the selected content items 304, the classifier 306 can provide hash values 310 of the selected content items 304.

A pairwise distance value can be generated for the hash value 308 of the evaluation content item 302 and the hash value of each content item assigned to group A 312. As shown, for group A 312, a pairwise distance value is generated in relation to the hash value 308 and each hash value for a content item #1, a content item #2, a content item #3, a content item #4, and other content items assigned to group A 312. A decay function, such as an exponential decay function, can be applied to each distance value in group A 312 to generate a weighted distance value (DV). For group B 316, a pairwise distance value is generated in relation to the hash value 308 and each hash value for a content item #5, a content item #6, a content item #7, a content item #8, and other content items assigned to group B 316. The decay function likewise can be applied to each distance value in group B 316 to generate a weighted distance value (DV). The present technology can proceed with respect to other groups in a similar manner and conclude with a final group N 320.

A score can be generated for each group. The score can result from a summation of all weighted distance values in a group. As shown, group A 312 is associated with a group A score 314, group B 316 is associated with a group B score 318, and group N 320 is associated with a group N score 322.

The group A score 314, the group B score 318, and the group N score 322 can be sorted. As shown, a sorting 324 can result in an ordered list of groups based on their scores. The list can represent a descending order of group scores. In some embodiments, one or more top scores can be selected based on a threshold selection value applied to the list. The locations associated with the selected top scores can be candidate locations for the evaluation content item 302.

Figure 4:
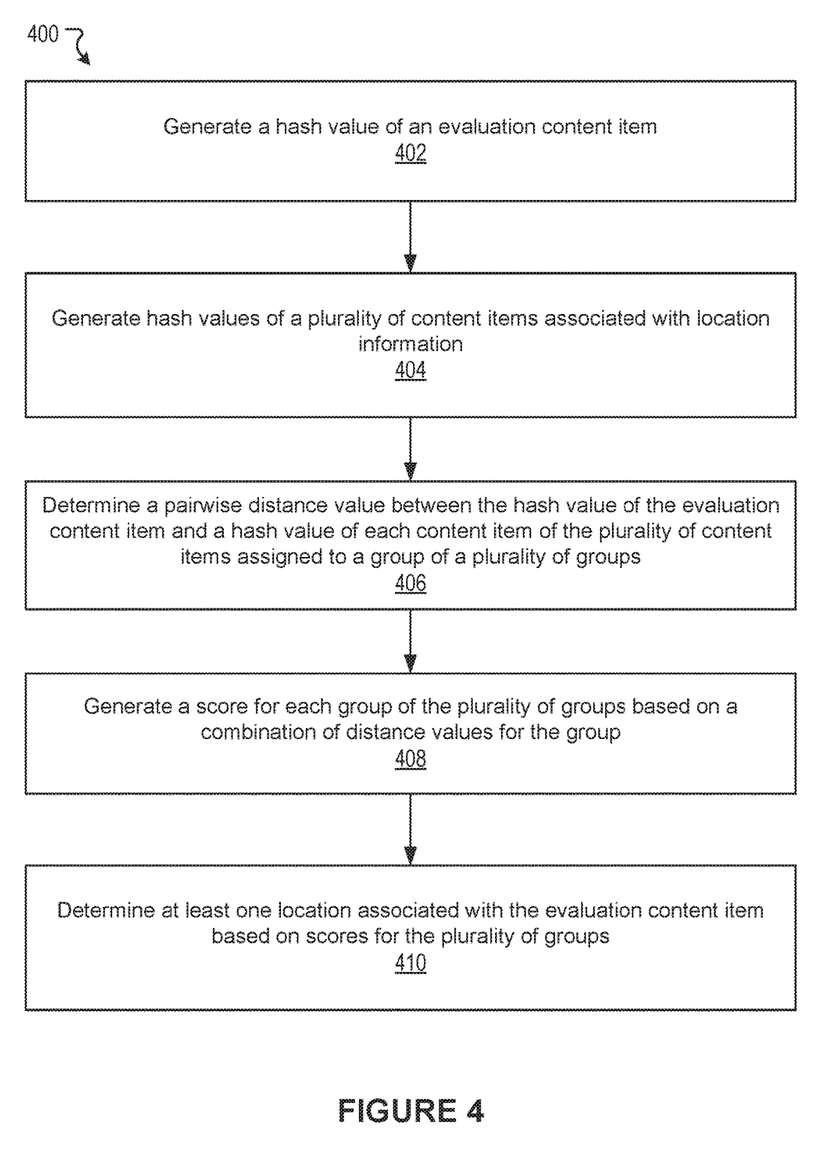
FIG. 4 illustrates a first method to determine a location for an evaluation content item, according to an embodiment of the present technology.

FIG. 4 illustrates a first example method 400 to determine one or more candidate locations for an evaluation content item, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can generate a hash value of an evaluation content item. At block 404, the method 400 can generate hash values of a plurality of content items associated with location information. At block 406, the method 400 can determine a pairwise distance value between the hash value of the evaluation content item and a hash value of each content item of the plurality of content items assigned to a group of a plurality of groups. At block 408, the method 400 can generate a score for each group of the plurality of groups based on a combination of distance values for the group. At block 410, the method 400 can determine at least one location associated with the evaluation content item based on scores for the plurality of groups. Other suitable techniques that incorporate various features and embodiments of the present technology are possible.

Figure 5A:
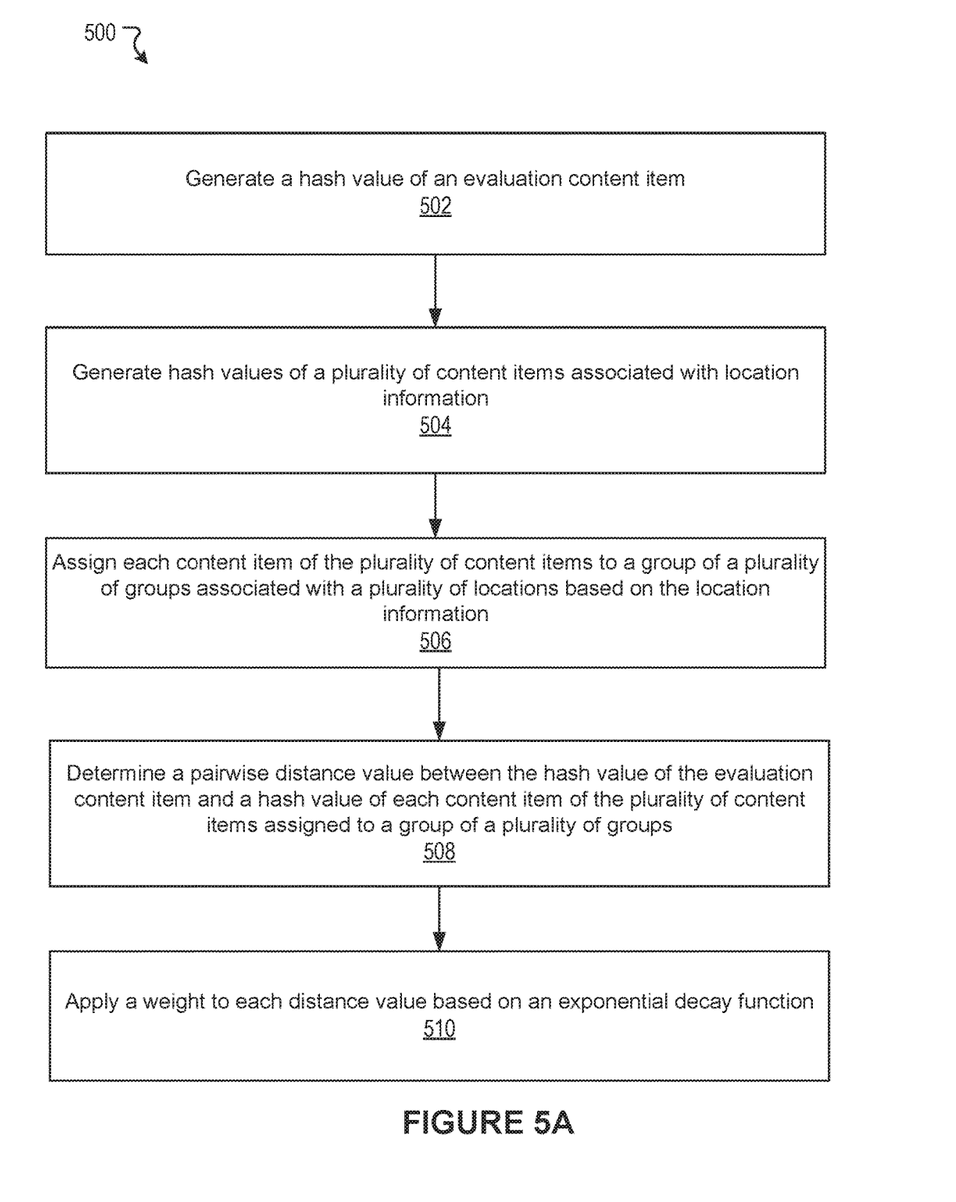
FIGS. 5A-5B illustrate a second method to determine a location for an evaluation content item, according to an embodiment of the present technology.
Figure 5B:
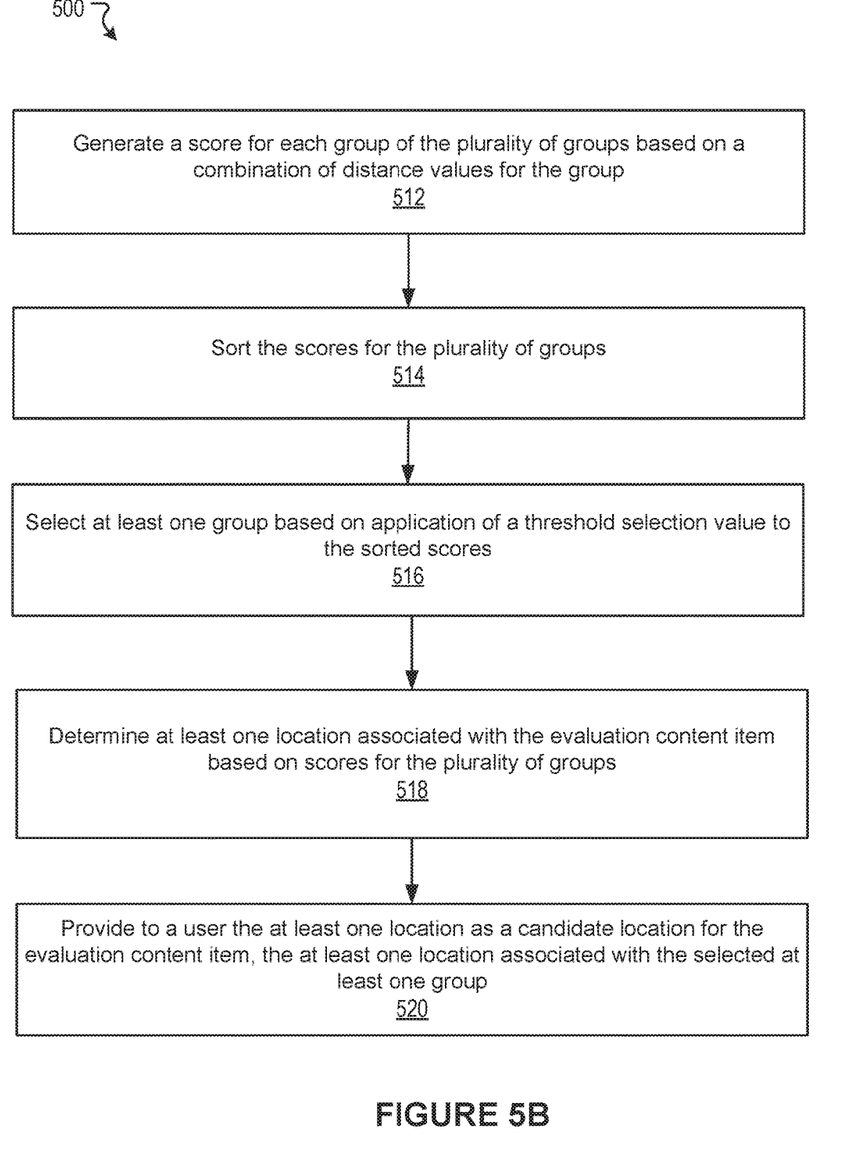

FIGS. 5A-5B illustrate a second example method 500 to determine one or more candidate locations for an evaluation content item, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can generate a hash value of an evaluation content item. At block 504, the method 500 can generate hash values of a plurality of content items associated with location information. At block 506, the method 500 can assign each content item of the plurality of content items to a group of a plurality of groups associated with a plurality of locations based on the location information. At block 508, the method 500 can determine a pairwise distance value between the hash value of the evaluation content item and a hash value of each content item of the plurality of content items assigned to a group of a plurality of groups. At block 510, the method 500 can apply a weight to each distance value based on an exponential decay function. At block 512, the method 500 can generate a score for each group of the plurality of groups based on a combination of distance values for the group. At block 514, the method 500 can sort the scores for the plurality of groups. At block 516, the method 500 can select at least one group based on application of a threshold selection value to the sorted scores. At block 518, the method 500 can determine at least one location associated with the evaluation content item based on scores for the plurality of groups. At block 520, the method 500 can provide to a user the at least one location as a candidate location for the evaluation content item, the at least one location associated with the selected at least one group. Other suitable techniques that incorporate various features and embodiments of the present technology are possible.

Social Networking System—Example Implementation

Figure 6:
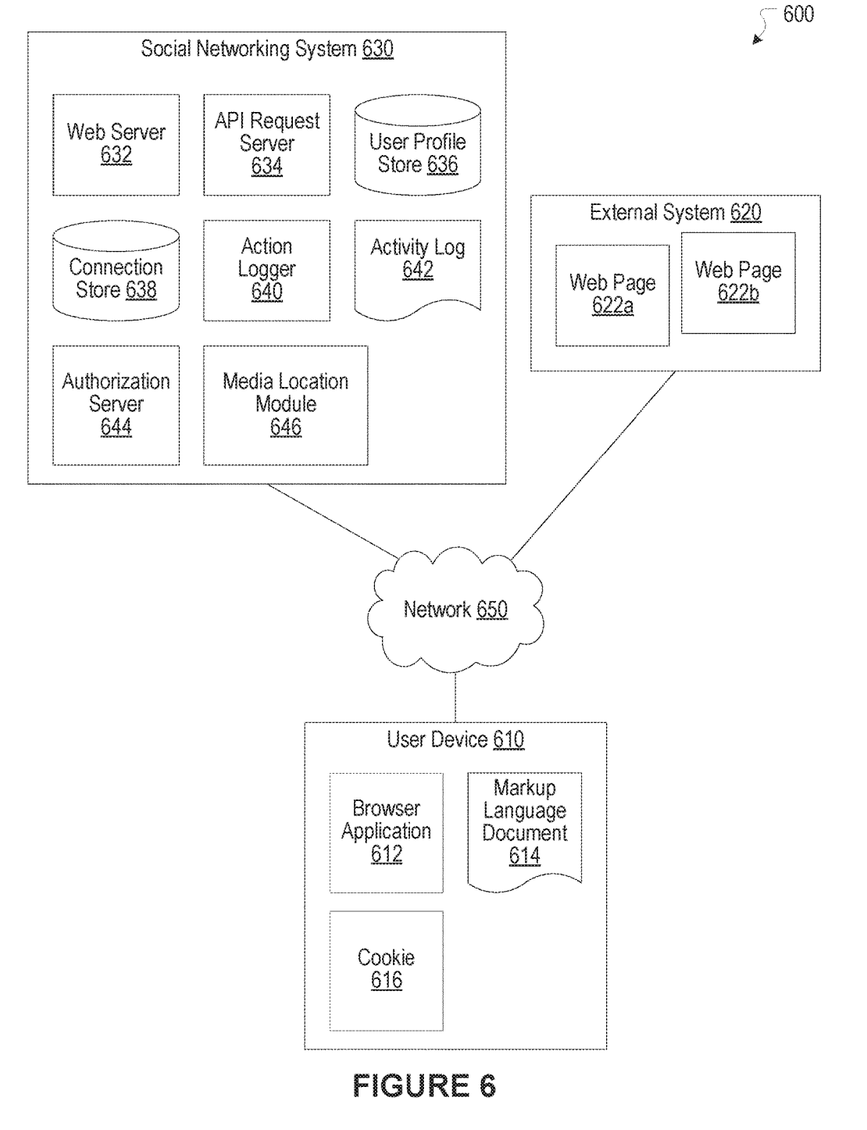
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a media location module 646. The media location module 646 can be implemented with the media location module 102, as discussed in more detail herein. In some embodiments, one or more functionalities of the media location module 646 can be implemented in the user device 610.

Hardware Implementation

Figure 7:
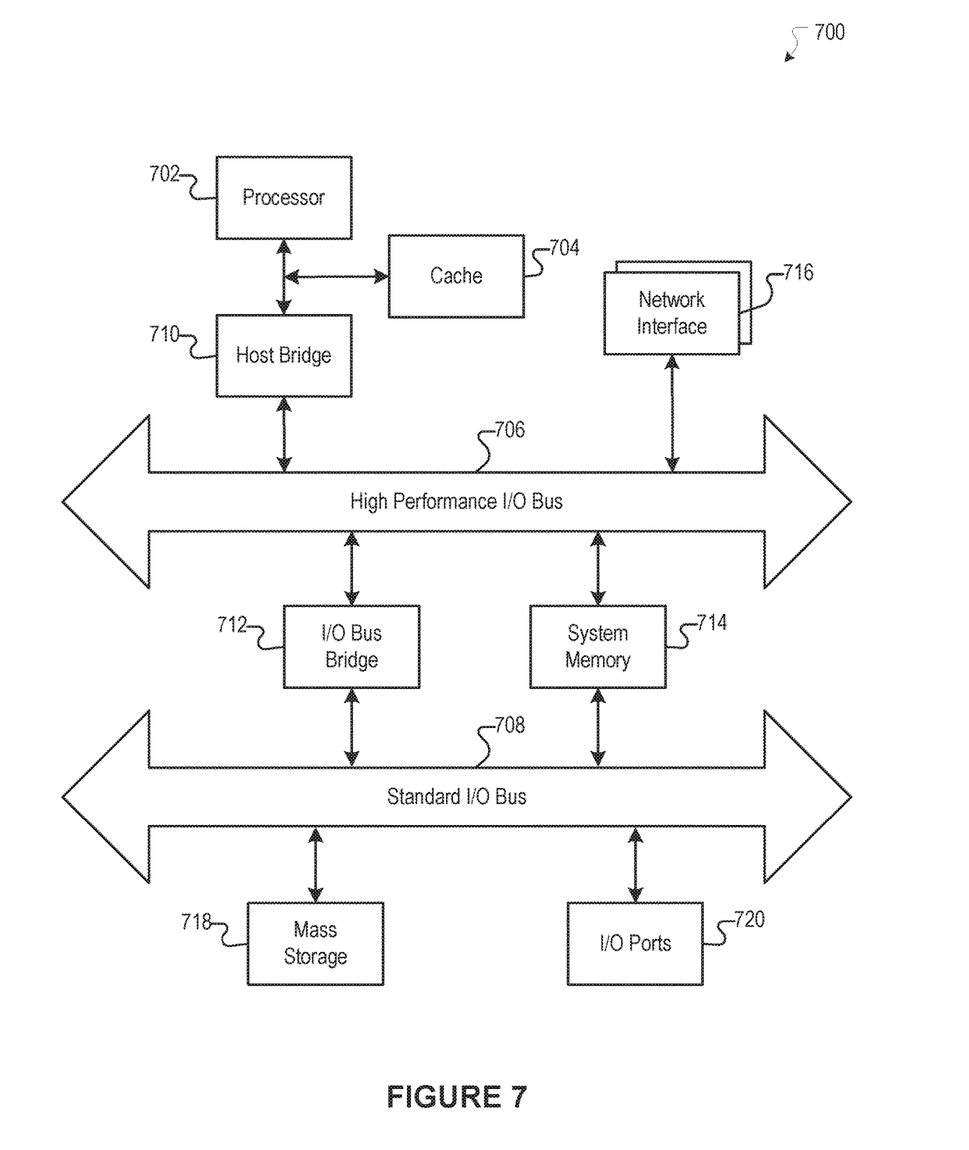
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a pairwise distance value between a hash value that has been generated for an evaluation content item and a hash value that has been generated for each content item of a plurality of content items associated with location information and assigned to a group of a plurality of groups, wherein the evaluation content item is associated with a position subject to a range of error;
   generating, by the computing system, a score for each group of the plurality of groups based on a combination of distance values for the group; and
   determining, by the computing system, at least one location associated with the evaluation content item based on scores for the plurality of groups.

2. The computer-implemented method of claim 1, further comprising:
   assigning each content item of the plurality of content items to a group of the plurality of groups based on the location information, wherein the plurality of groups are associated with a plurality of locations.

3. The computer-implemented method of claim 2, wherein assignment of the content item to the group satisfies a threshold confidence level.

4. The computer-implemented method of claim 1, further comprising:
   determining an area based on application of a threshold radius value to the position associated with the evaluation content item; and
   selecting the plurality of content items from a set of content items based on locations associated with the plurality of content items that fall within the area.

5. The computer-implemented method of claim 1, further comprising:
   applying a weight to each distance value.

6. The computer-implemented method of claim 5, wherein the weight is based on an exponential decay function.

7. The computer-implemented method of claim 1, further comprising:
   sorting the scores for the plurality of groups;
   selecting at least one group based on application of a threshold selection value to the sorted scores; and
   providing to a user the at least one location as a candidate location for the evaluation content item, the at least one location associated with the selected at least one group.

8. The computer-implemented method of claim 1, wherein the location information is at least one of a place, an address, a residence, an establishment, and other type of location.

9. The computer-implemented method of claim 1, wherein the combination of distance values for the group is a summation of weighted distance values for the group.

10. A system comprising:
    at least one processor; and
    a memory storing instructions that, when executed by the at least one processor, cause the system to perform:
    determining a pairwise distance value between a hash value that has been generated for an evaluation content item and a hash value that has been generated for each content item of a plurality of content items associated with location information and assigned to a group of a plurality of groups, wherein the evaluation content item is associated with a position subject to a range of error;

generating a score for each group of the plurality of groups based on a combination of distance values for the group; and determining at least one location associated with the evaluation content item based on scores for the plurality of groups.

11. The system of claim 10, further comprising:

assigning each content item of the plurality of content items to a group of the plurality of groups based on the location information, wherein the plurality of group groups are associated with a plurality of locations.

12. The system of claim 10, further comprising:

determining an area based on application of a threshold radius value to the position associated with the evaluation content item; and selecting the plurality of content items from a set of content items based on locations associated with the plurality of content items that fall within the area.

13. The system of claim 10, further comprising:

applying a weight to each distance value.

14. The system of claim 10, wherein the combination of distance values for the group is a summation of weighted distance values for the group.

15. A non-transitory computer-readable storage medium including instructions that, when executed by at least one processor of a computing system, cause the computing system to perform a method comprising:

determining a pairwise distance value between a hash value that has been generated for an evaluation content item and a hash value that has been generated for each content item of a plurality of content items associated with location information and assigned to a group of a plurality of groups, wherein the evaluation content item is associated with a position subject to a range of error;

generating a score for each group of the plurality of groups based on a combination of distance values for the group; and determining at least one location associated with the evaluation content item based on scores for the plurality of groups.

16. The non-transitory computer-readable storage medium of claim 15, further comprising:

assigning each content item of the plurality of content items to a group of the plurality of groups based on the location information, wherein the plurality of group groups are associated with a plurality of locations.

17. The non-transitory computer-readable storage medium of claim 15, further comprising:

determining an area based on application of a threshold radius value to the position associated with the evaluation content item; and selecting the plurality of content items from a set of content items based on locations associated with the plurality of content items that fall within the area.

18. The non-transitory computer-readable storage medium of claim 15, further comprising:

applying a weight to each distance value.

19. The non-transitory computer-readable storage medium of claim 15, wherein the combination of distance values for the group is a summation of weighted distance values for the group.

* * * * *